Figure 1:
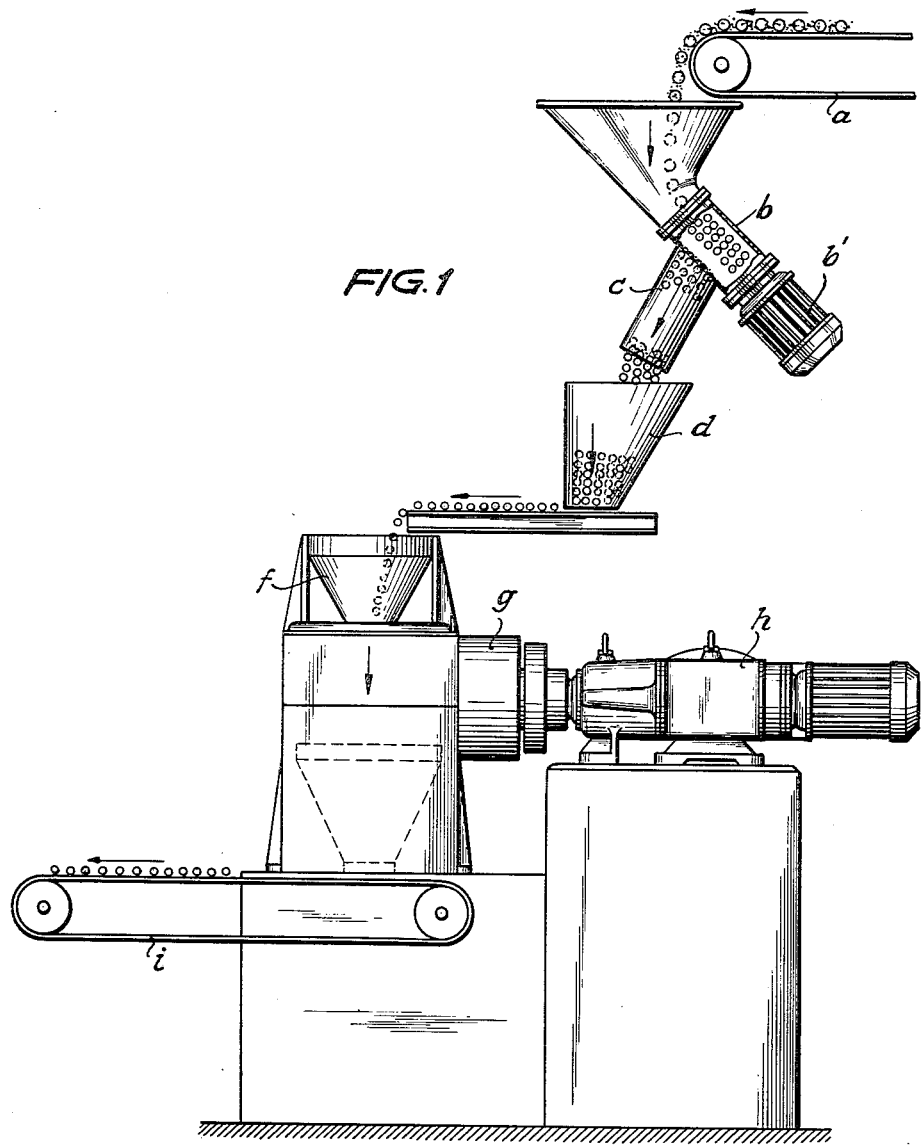

Aug. 21, 1962  O. BRENDEL ETAL  3,049,760
METHOD AND APPARATUS FOR MASS-PRODUCING
SMALL BALLS OF PLASTIC MATERIALS
Filed March 25, 1960  2 Sheets-Sheet 1

INVENTORS
Oskar Brendel
Kurt Grantz
Karl Ernst Hofstadt
W. Franz by Malcolm W. Fraser
attorney Aug. 21, 1962  O. BRENDEL ETAL  3,049,760
METHOD AND APPARATUS FOR MASS-PRODUCING
SMALL BALLS OF PLASTIC MATERIALS
Filed March 25, 1960  2 Sheets-Sheet 2

INVENTORS
Oscar Brendel
Kurt Grantz
Karl Ernst Hoffstadt
W. Franz by Malcolm W. Fraser
attorney United States Patent Office 3,049,760
Patented Aug. 21, 1962

3,049,760
METHOD AND APPARATUS FOR MASS-PRODUCING SMALL BALLS OF PLASTIC MATERIALS
Oskar Brendel and Kurt Grantz, Kochel, Upper Bavaria, Karl-Ernst Hofstadt, Munich, and Werner Franz, Moosburg, Upper Bavaria, Germany
Filed Mar. 25, 1960, Ser. No. 21,076
2 Claims. (Cl. 18—55)

The present invention relates to a new method of producing balls of plastic materials and especially such balls with a relatively small diameter of about 5 mm. and less.

Due to their spherical shape and the maximum surface area attainable through such shape, such balls which may be made, for example, of ceramic materials, are especially adapted to be used as catalysts and the like for chemical reactions. Because of the high filling capacity attainable with such small balls, and their high abrasion resistance, they are also very suitable to be used as fillers and for other purposes, especially in the chemical industry.

Although there has always been a great need for such small balls, they have so far not been commercially available because of the lack of a method of mass-producing them economically. Therefore, since such balls to be of practical use would be required in a quantity of many millions, the known methods of producing spherical bodies, for example, by the ball rolling method or by means of tablet-forming presses, are not even worth considering for this purpose because of their relatively small output.

The known method of producing relatively large spherical bodies, for example, of pressed coal or briquettes, that is, of round bodies of a diameter of 50 mm. and more, by means of roll presses could normally also not be applied to attain an economical mass production of the desired small balls of plastic material. While it is a very simple matter properly to fill the large molds required for making bodies of such a large size and weight from only slightly adhesive mixtures of granular coal and binding agents, and while it also involves no difficulties to remove the pressed coal pieces from these molds from which they usually fall out of their own accord, it is practically impossible to do so with the pasty, highly adhesive raw materials as are required for making catalysts and the like in the form of small balls of a diameter of 5 mm. and even smaller sizes.

Since there was no machinery available to make such small uniform balls economically and in mass production for industrial purposes, it has previously been necessary to resort instead to small cylindrical bodies which can be easily made by an extrusion process. However, because of their uneven shape, such cylindrical bodies are subject to considerable abrasion and have a poor filling capacity, resulting in a considerable number of void spaces when used as fillers, and also have poor suspension qualities within a stream of material.

These disadvantages are especially serious if the small bodies are to be used for their most important purpose, namely, as catalysts or catalytic carriers in catalytic reactions, especially in apparatus for cracking mineral oil. In such processes, the surfaces of the small bodies should be as uniform as possible. The cylindrical bodies which necessarily had to be used prior to this invention for want of small spherical bodies were then worn off very quickly to such a considerable extent that high losses in catalysts would result. The originally cylindrical bodies were soon worn off into an ellipsoidal shape, that is, a shape which is extremely unfavorable for attaining a close filling density of the material. Furthermore, even the apparatus itself was worn excessively by such angular catalysts moving therein.

It is, therefore, an object of the present invention to provide a new method of molding plastic materials into spherical bodies of a very small size, for example, of a diameter of 5 mm. or less.

Another object of the present invention is to provide a method of mass-producing such small spherical bodies, for example, of bentonite, at a rate of ten millions and more per hour.

A further object of the present invention is to provide a method of the above-mentioned kind which may be carried out at a relatively low expense and by means of a relatively simple and inexpensive apparatus, and consequently it is still another object of the invention to provide such apparatus which is especially adapted for mass-producing such small spherical bodies.

Although the method according to the present invention relies upon the same basic principle which is applied in making relatively large spherical bodies of a granular material such as pressed coal or briquettes, namely, of molding the small bodies between a pair of pressure rolls and within corresponding pairs of equal mold cavities in these rolls of a size corresponding to the size of the desired balls, the present invention involves a thoroughly novel concept as to the manner and means of filling the corresponding mold cavities within the outer peripheral walls of the two cooperating rolls very quickly, uniformly, and completely with the sticky plastic materials required for making the small balls according to the invention, and of removing the small molded balls from these cavities after they have passed beyond the gap between the rolls.

In order to accomplish the above-mentioned objects, the method according to the invention at first involves a suitable preliminary treatment of the raw materials of which the small balls are to be made so as to transform these materials into a mass of a fully homogeneous but crumbly consistency which is capable of being screened. This treatment which, if necessary, may be carried out repeatedly, preferably consists of inserting the mass into a cylindrical screen which revolves at a very high rate of speed, and of passing the mass through such screen. This treatment imparts to these small crumbs the properties which are important for the subsequent treatment of the mass, especially make them adapted to slide freely and in an uninterrupted layer of uniform density along the walls of a feeding hopper which are inclined at an angle corresponding to the sliding angle of the crumbly particles, and pass into a part having vertical side walls, said part fitting closely against the outer surfaces of the rolls on both sides of their common tangential plane. The inclined walls of the receiving hopper conduct the crumbly particles to the interior of the part with vertical side walls, through which they fall freely upon the outer surfaces of the revolving rolls and thus towards the gap between them which then press the material into the small corresponding mold cavities in their peripheral surfaces, each of which may have a depth of, for example, about 2 to 3 mm. or less. The operation of filling the mold cavities is thus carried out not merely by the action of the gravity of the material, but the material by sliding downwardly at a uniform speed and a uniform quantity is drawn into the gap between the rolls which is tightly closed at both sides, and is thus drawn into the mold cavities.

Another very important object of the present invention is to provide suitable means for preventing the highly adhesive material which is to be molded by pressure into very small balls from sticking to the surfaces of the mold cavities in the peripheral walls of the pressure rolls.

This object may be accomplished according to the invention by coating the surfaces of the mold cavities with a thin film of a suitable liquid, preferably an oil emulsion, which is sprayed upon these surfaces before they reach the gap between the revolving pressure rolls. This oil film is preferably applied to the mold cavities at a very specific quantity and in a manner so as to insure that the material to be molded will not become mixed with the oil emulsion and that, at least at the time when the pressure rolls proceed to carry out their pressing operation, the outer peripheral roll surfaces themselves will not also be moistened by the oil emulsion but be substantially dry. According to a preferred embodiment of the invention, such selective coating of the mold cavities only may be attained by providing suitable moisture-wiping or absorbing means at a point of entry of the pressure rolls between the walls of the feeding hopper which close off the gap between the rolls toward the outside. These means may be in the nature of a doctor blade or consist of rotating wiping rolls of absorbent material which are held in engagement with the outer surfaces of the pressure rolls and wipe these outer surfaces dry of any oil emulsion so that the oil coating will only remain on the concave hemispherical surface of each mold cavity entering between the walls of the feeding hopper and into the gap between the pressure rolls. These means will insure that the mold cavities will always be completely and uniformly filled with the respective material to be molded, and that this sticky material itself will not come into any direct contact with the steel surfaces of the mold cavities.

Although, as in most pressure-molding operations, the pressure rolls are preferably maintained at a uniform increased temperature, which may be attained by suitable heating means, preferably electrical, which are controlled automatically, the small balls after being molded between the pressure rolls will, despite the oil film on the surfaces of the mold cavities and despite such heating, still have the tendency to adhere to the mold cavities and not drop out of their own accord by gravity since their low weight might not exceed the force of their adhesion within the mold cavities.

It is therefore a further object of the present invention to provide suitable means which are adapted to overcome such adhesive force and remove the small balls from the mold cavities. This may be accomplished according to the invention by projecting jets of compressed air of suitable intensity in a substantially tangential direction upon the lower half of each pressure roll or by passing a strong air current from one side along the outer surfaces of the pressure rolls so that such jets or currents will impinge laterally upon the portions of each molded ball which project from the mold cavities and thereby shell or roll the balls laterally out of the mold cavities. Depending upon the strength of the adhesion of the molded balls within the mold cavities and the strength of the jets directed upon the balls, one row of compressed-air nozzles may suffice or several rows of such nozzles may be disposed above each other along the peripheral surface of the lower half of each pressure roll and be inclined at different angles in accordance with their respective tangents relative to the peripheral surfaces of the rolls.

Of course, the cooling effect exerted upon the pressure rolls by the compressed-air jets should be compensated by an increased heating of the rolls.

Practical experience with an apparatus according to the invention consisting of a roll press with pressure rolls of a diameter of only 350 mm. which were rotated at a speed of, for example, 20 r.p.m., has shown that, if all of the steps of the new method as above described are properly carried out, it is possible to attain a continuous production of approximately 7 million balls of 5.5 mm. diameter per hour.

In order to insure that the balls will be entirely smooth and without seams, one of the two pressure rolls should be adjustable relative to the other roll so as to permit the width of the gap between the rolls to be regulated. Instead of mounting the pressure rolls as in roll presses known for other purposes so as to press resiliently against each other, it has also been found advisable to mount the pressure rolls of the roll press according to the invention rigid with respect to another, this being necessary in consideration of the small size of the alveoles. To secure in spite of this the uniform pressure in the gap between the rolls, they are preferably maintained at a constant temperature by suitable cooling.

Figure 2:
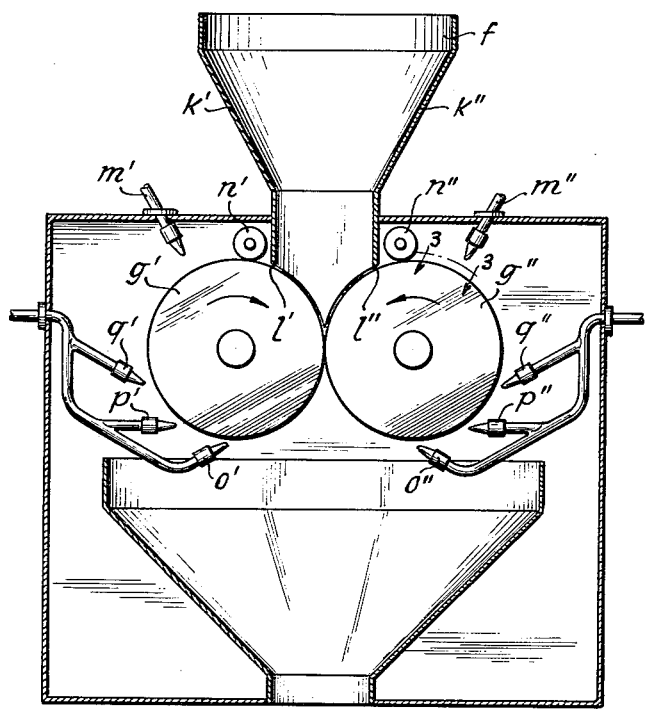
Figure 3:

Further objects, features, and advantages of the present invention will be apparent from the following detailed description thereof, particularly when read with reference to the accompanying diagrammatic drawings of a preferred embodiment of the apparatus for carrying out the new method, in which:

FIGURE 1 diagrammatically illustrates a general view of the entire apparatus; while FIGURE 2 shows a diagrammatic radial cross section of the roll press and the means which are directly associated therewith, and FIG. 3 is an enlarged fragmentary sectional view in detail along line 3—3 of FIG. 2.

Referring to the drawings and first particularly to FIGURE 1, the material to be pressed into small balls is first prepared, for example, by forming a crumbly mixture of a material which has been dehydrated by a filter press and is capable of being screened, with a dry material, the water content of which is very accurately determined and controlled by suitable measuring instruments and control apparatus known in the art. This mixture is then passed by a conveyor belt $a$ into the funnel-shaped inlet of a screening apparatus which preferably consists of a cylindrical screen $b$ with a mesh size of approximately 4 to 6 mm. which is driven by a motor $b'$ so as to revolve at a high rate of speed, for example, at about 2000 r.p.m. The screened material then passes through an outlet pipe $c$ into a distributor $d$ from which it is uniformly distributed upon an intermediate conveyor which feeds the material uniformly into a funnel-shaped hopper $f$ from which it passes into the gap between the pressure rolls of a roll press $g$ which is driven by a motor $h$. After the material has been compressed into balls within the corresponding hemispherical mold cavities in the outer walls of the rolls of this press, these balls are dropped upon a conveyor belt $i$ and are thereby conveyed to a suitable drying apparatus, not shown.

The roll press according to the invention as illustrated in FIG. 2 essentially consists of the funnel-shaped hopper $f$, the walls $k'$ and $k''$ of which are inclined in accordance with the gliding angle of the crumbly material supplied thereto and the surfaces of which are suitably ground or covered with replaceable ground plates. These inclined walls merge into vertical wall portions $l$ and $l'$ which terminate closely adjacent to and between rolls $g'$ and $g''$ and at both sides of the gap between the rolls so as to close the gap tightly toward the outside.

Before the revolving roll surfaces reach the wall portion $l'$ and $l''$ an oil emulsion is sprayed thereon through nozzles $m'$ and $m''$. The emulsion adhering to the outer peripheral surfaces of the pressure rolls $g'$ and $g''$ themselves is thereafter removed from these surfaces by wiping rolls $n'$ and $n''$ which are driven at a suitable rate of speed. These rolls may consist of or be covered with an absorbent material. Suitable means may also be provided to withdraw the accumulated moisture from these wiping rolls $n'$ and $n''$, for example, by suction.

After passing beyond the roll gap the small balls which have been molded by the pressure of rolls $g'$ and $g''$ within the corresponding mold cavities (illustrated in FIG. 3) in the peripheral surfaces of these rolls and which still adhere within the mold cavities are subjected to strong jets of compressed air which issue from several rows of nozzles $o'$, $p'$, $q'$, and $o''$, $p''$, $q''$, respectively, which extend in a tangential direction relative to the peripheral wall surface of each roll. The jets of compressed air thus act in a lateral direction upon the outer parts of the molded balls which project from the mold cavities and thus immediately extricate the balls from these cavities which then drop into the receiving hopper and thence upon the conveyor belt $i$, as previously described.

The apparatus is also provided with suitable means, not shown, for heating the press rolls $g'$ and $g''$, and for cooling the driving shafts thereof. One of the rolls is preferably also provided with suitable means, not shown, for adjusting it in a lateral direction relative to the other roll to regulate the width of the gap between the rolls.

In accordance with one actual embodiment of the invention, the roller press including the pressure rolls $g'$ and $g''$, each roll of 350 mm. diameter, operated at 20 rotations per minute. The apparatus produced 7 million balls per hour; that is, 115,000 balls per minute, therefore approximately 6,000 balls per single rotation of the rolls $g'$ and $g''$. On the surface of each roller there were 6,000 cavities each having a depth of 2 to 3 mm.; or, in other words, there were per each 110 centimeters of the roller surface approximately 60 small cavities adjacent each other, arranged in adjacent rows staggered with respect to each other, whereby only a very small lattice was left separating the cavities.

A perfect filling of the cavities of the rolls $g'$ and $g''$ is accomplished in accordance with the invention by pretreating the material to be compressed, in the rotating cylindrical sieve $b$ running with an exceedingly high rate of 2,000 rotations per minute, and having a mesh size which is approximately the same as the diameter of the ball to be produced. The material is comminuted into fragments having approximately the same volume as the balls which are to be produced. The result is that by guiding this material of predetermined size of fragments to the rotary press, every combination of two cooperating cavities practically is filled by one fragment, which thereafter by passing the gap of the roller merely receives the rounded shape of the ball which is to be produced.

Although the individual elements of the apparatus as well as some of the steps of the method of producing the balls according to the present invention may have been disclosed in the prior art, it is the concept and merit of the present invention to combine these various features in a new manner and so as to attain an entirely new result whereby the difficulties which previously prevented a mass production of very small bodies of plastic and especially ceramic materials of a spherical or similar shape will be completely overcome.

Although our invention has been illustrated and described with reference to the preferred embodiments thereof, we wish to have it understood that it is in no way limited to the details of such embodiments, but is capable of numerous modifications within the scope of the appended claims.

This application is a continuation-in-part of our application Serial No. 722,218, filed March 18, 1958 and now abandoned.

Having thus fully disclosed our invention, what we claim is:

1. A method for producing balls or pellets of diameters in the order of about 5 mm. made from ceramic and other compressible materials including the steps of: subjecting the material to be compressed to centrifugal force within a rotating cylindrical sieve having a mesh size substantially equal to the diameter of the balls or pellets to be produced, thereby slightly compressing the material and forming fragments of the material of a volume slightly greater than the volume of the balls or pellets to be produced and of a diameter of substantially the size as the diameter of the balls or pellets to be produced; transferring and feeding said fragments to the roller gap of a pair of rotating pressure rolls each having a plurality of corresponding mold cavities formed therein, whereby each of said fragments fills one of the mold cavities; and finally additionally slightly compressing and reshaping said fragments within the corresponding mold cavities to form balls or pellets.

2. A method for producing balls or pellets of diameter of the order of about 5 mm. from ceramic and other compressible materials including steps of: subjecting the initial material to centrifugal force within a rotating cylindrical sieve having a mesh size substantially equal to the diameter of the balls or pellets to be produced, thereby slightly densifying the material and forming fragments thereof of a volume nearly the same as the volume of the balls or pellets to be produced and of a diameter of substantially the same size as the diameter of the balls or pellets to be produced; transferring and feeding the fragments in substantially the same shape to the roller gap of a pair of rotating pressure rolls, each having a plurality of corresponding mold cavities formed therein, whereby each of fragments fills one of the corresponding mold cavities; compressing the fragments within the corresponding mold cavities thus forming balls or pellets; and thereafter loosening and removing the balls or pellets from the cavities.

References Cited in the file of this patent

UNITED STATES PATENTS

| | | |
|---|---|---|
| 379,068 | Heller et al. | Mar. 6, 1888 |
| 533,488 | Nirdlinger | Feb. 5, 1895 |
| 667,050 | Zwoyer | Jan. 29, 1901 |
| 2,258,659 | Mosler | Oct. 14, 1941 |
| 2,675,304 | Komarek | Apr. 13, 1954 |
| 2,717,419 | Dickey | Sept. 13, 1955 |
| 2,811,750 | Cofek | Nov. 5, 1957 |
| 2,874,417 | Ramse | Feb. 24, 1959 |

FOREIGN PATENTS

| | | |
|---|---|---|
| 1,123,104 | France | June 4, 1956 |